United States Patent [19]

James

[11] 4,165,187

[45] Aug. 21, 1979

[54] APPARATUS FOR MIXING AND DISPENSING REACTIVE FLUIDS

[75] Inventor: James R. James, Plymouth, Mich.

[73] Assignee: Accuratio Systems, Inc., Novi, Mich.

[21] Appl. No.: 894,992

[22] Filed: Apr. 10, 1978

[51] Int. Cl.² ............................................. B01F 15/00
[52] U.S. Cl. .................................................. 366/150
[58] Field of Search ............... 366/150, 177, 182, 184, 366/174, 138

[56] References Cited

U.S. PATENT DOCUMENTS

| | | | |
|---|---|---|---|
| 3,450,388 | 6/1969 | Stump | 366/138 |
| 3,858,852 | 1/1975 | Breer et al. | 366/177 |
| 3,895,781 | 7/1975 | Lödige et al. | 366/174 |
| 4,068,829 | 1/1978 | Laurent et al. | 366/177 |

Primary Examiner—Leonard D. Christian
Attorney, Agent, or Firm—Barnes, Kisselle, Raisch & Choate

[57] ABSTRACT

Reactive fluids are furnished from separate tanks continuously to a mixing head. The resulting mixture flows continuously through an outlet having a valve which directs the flow to one or another of a plurality of dispensing nozzles. Molds are moved synchronously and in some cases continually beneath the nozzles through which the mixture is dispensed.

27 Claims, 10 Drawing Figures

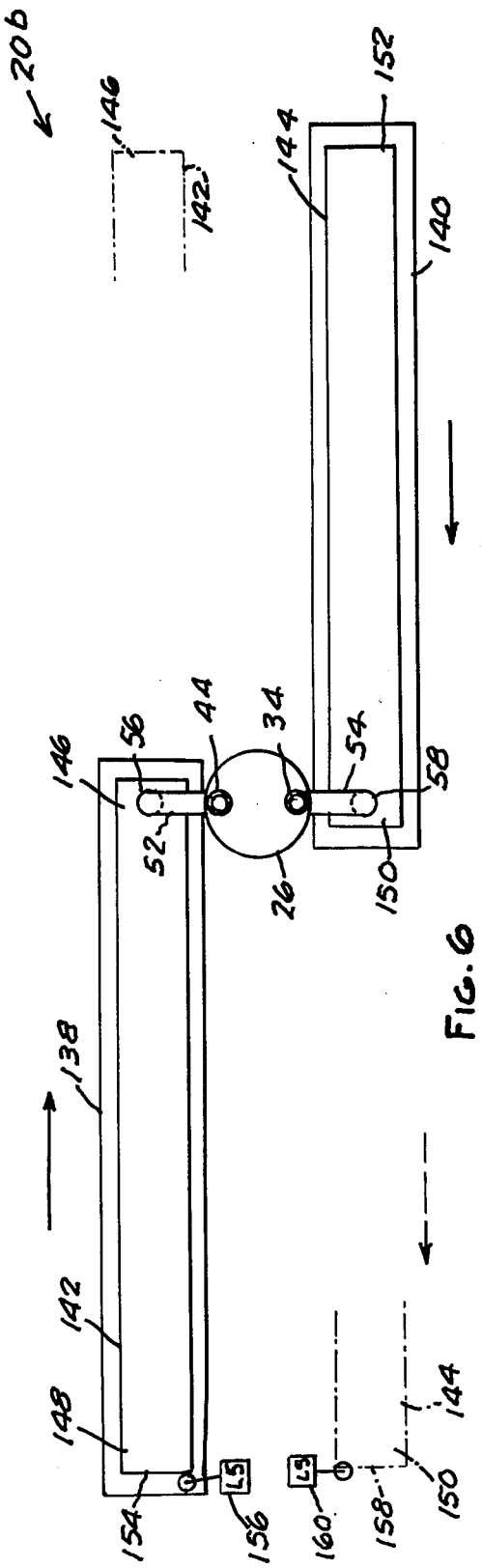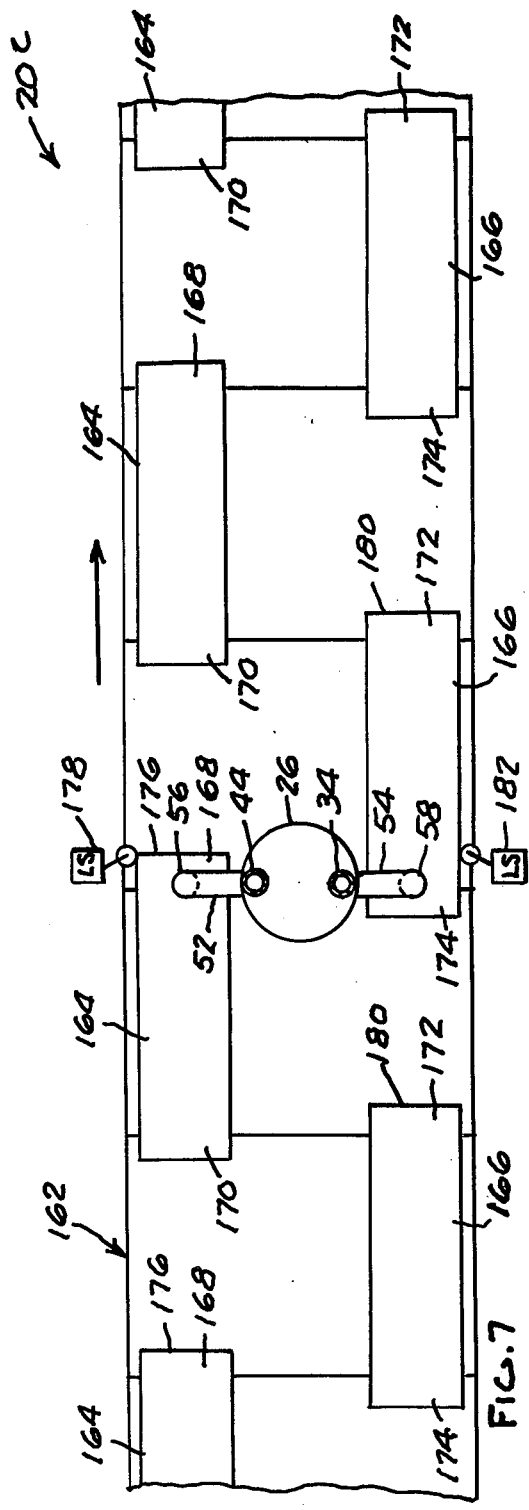

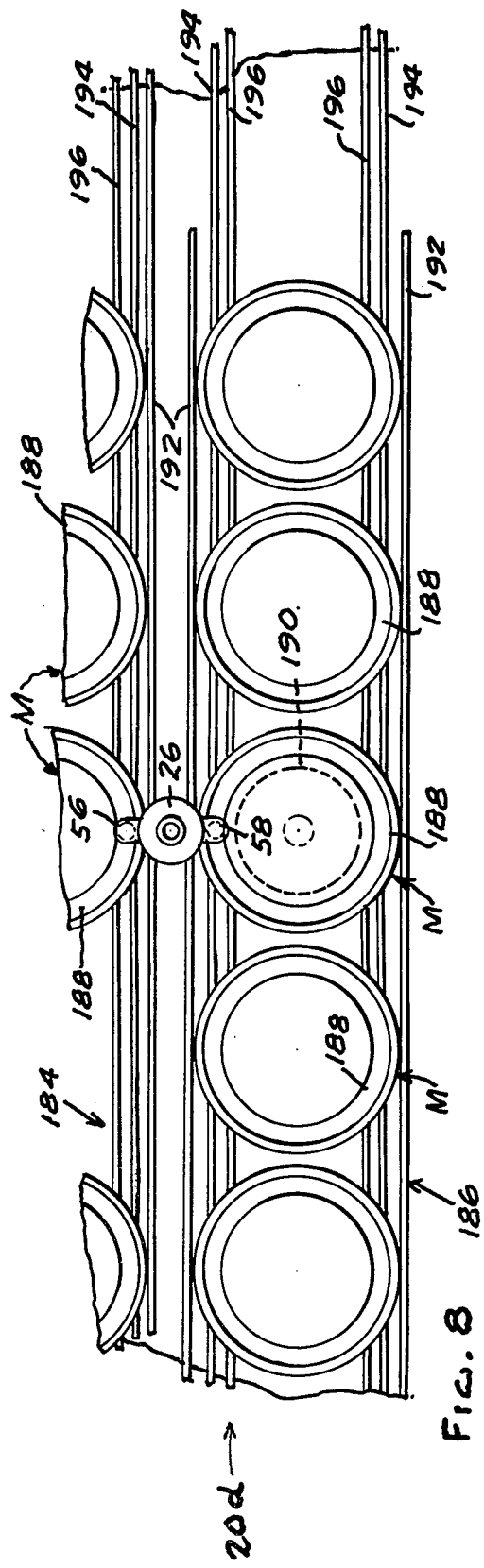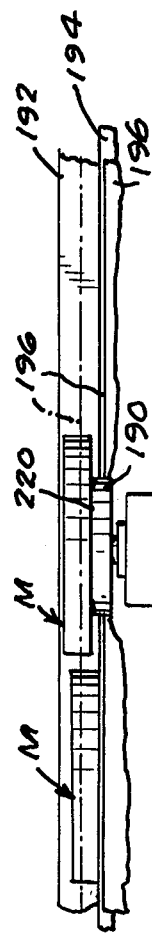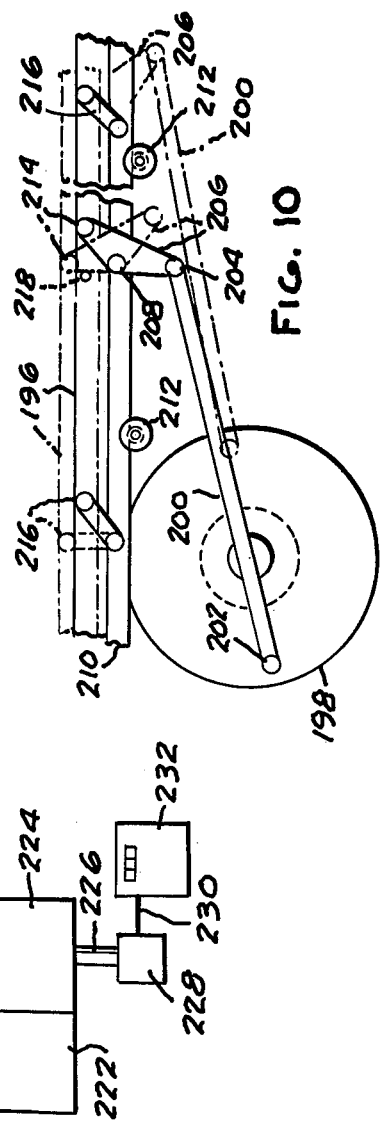

APPARATUS FOR MIXING AND DISPENSING REACTIVE FLUIDS

This invention relates to apparatus for mixing together a plurality of fluids which react with each other and dispensing the resulting fluid mixture into receptacals. Selected for illustration of the invention is apparatus for the manufacture of products by mixing together fluids which interact to form polyurethane materials and dispensing the resulting mixture into product-defining molds.

In conventional apparatus of this type, each of the fluids to be mixed and reacted is stored in a separate tank from which it is pumped to a mixing head. The mixing head has an outlet which communicates to a dispensing nozzle through a two-way valve. A series of molds are positioned successively beneath the nozzle. When a mold is in alignment with a nozzle the valve is turned on to fill the mold to the appropriate extent and the valve is then turned off. The next mold is then positioned in alignment with the nozzle and the valve turned on and off again. Thus, in filling a series of molds, the dispensing is intermittent and results in a continual starting and stopping of the flow of the fluids between the storage tanks and mixing head, within the mixing head and through the outlet therefrom.

The fluids begin to react while they are in the mixing head and must be dispensed promptly into a mold. There is no time to adjust the composition of the mixture once the reaction starts. Consequently, to form satisfactory products, the fluids must be delivered to the mixing head in a very accurate ratio typically with a variation no greater than 1%. Such accuracy is difficult to attain and this difficulty is aggravated by the continual starting and stopping of flow of the fluids through the conventional apparatus. The reason for such aggravation is that the two-way valve operates very quickly which causes almost instantaneous flow and pressure differences in upstream portions of the system creating conditions in which it is virtually impossible to maintain the flow ratios accurately. Particularly at the moment that dispensing begins, the ratio inaccuracy may be as high as 20%. Such momentary inaccuracies are not significant when dispensing in relatively large quantities, for example, 100 grams or more but it is generally accepted in the art these momentary inaccuracies preclude commercial-rate production of satisfactorily uniform products of less than 25-30 grams weight.

The conventional apparatus is relatively slow in operation because it dispenses only a part of the time. Moreover, during the non-dispensing periods, the component fluids begin to interact in the mixing head which requires that production be interrupted periodically to flush interacted material out of the mixing head, thereby further slowing the overall production rate.

The object of the present invention is to provide a relatively simple, inexpensive apparatus of the type under consideration, improved to eliminate largely or entirely the deficiencies of the conventional apparatus discussed above.

In the accompanying drawings:

FIG. 6 is a fragmentary diagrammatic top plan view of a modified form of the invention;

FIG. 7 is a fragmentary diagrammatic top plan view of another modified form of the invention;

FIG. 8 is a fragmentary partly diagrammatic top plan view of another modified form of the invention;

FIG. 9 is a fragmentary partly diagrammatic side elevational view of the structure illustrated in FIG. 8;

FIG. 10 is a fragmentary partly diagrammatic side elevational view illustrating a conveyor drive utilized in the FIG. 8 structure.

Figure 1:
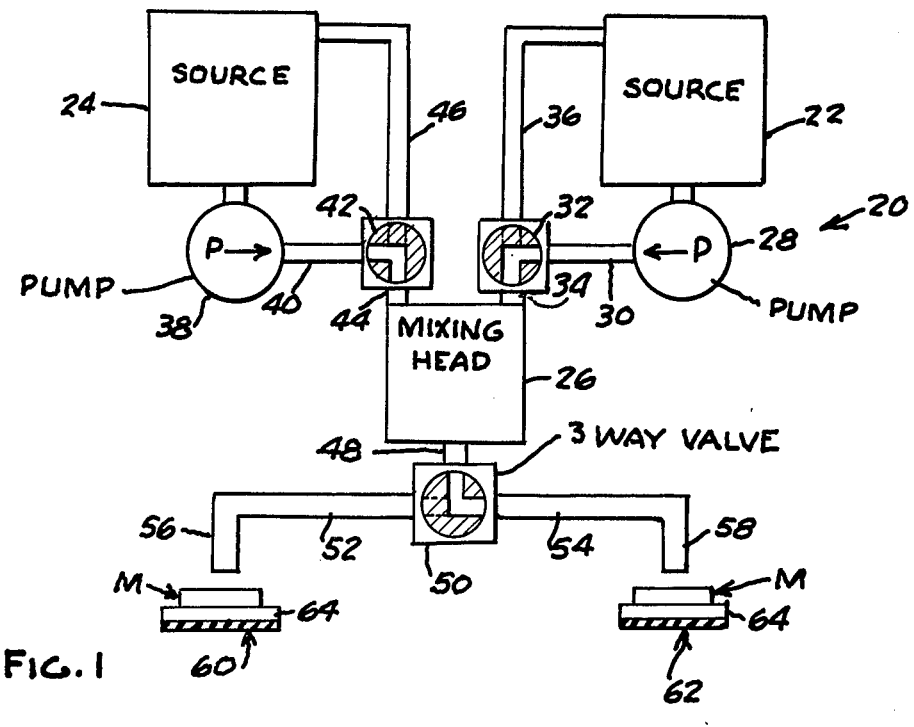
FIG. 1 is a diagrammatic elevational view of an apparatus according to the present invention.

Shown in FIG. 1 is an apparatus 20 according to the invention having a tank or a reservoir 22 forming a source for one of the fluids to be mixed and a tank or a reservoir 24 forming a source for the other of the fluids to be mixed. Fluid from source 22 is furnished to a mixing head 26 by a pump 28 through a hydraulic line 30 containing a three-way valve 32 operable selectively to introduce the fluid into an inlet 34 to mixing head 26 or to a hydraulic line 36 which returns to source 22. Similarly, fluid from source 24 is provided to head 26 by a pump 38 through a hydraulic line 40 having a three-way valve 42 operable selectively to introduce the fluid into inlet 44 to the mixing head or to a return line 46 to source 24.

Figure 2:
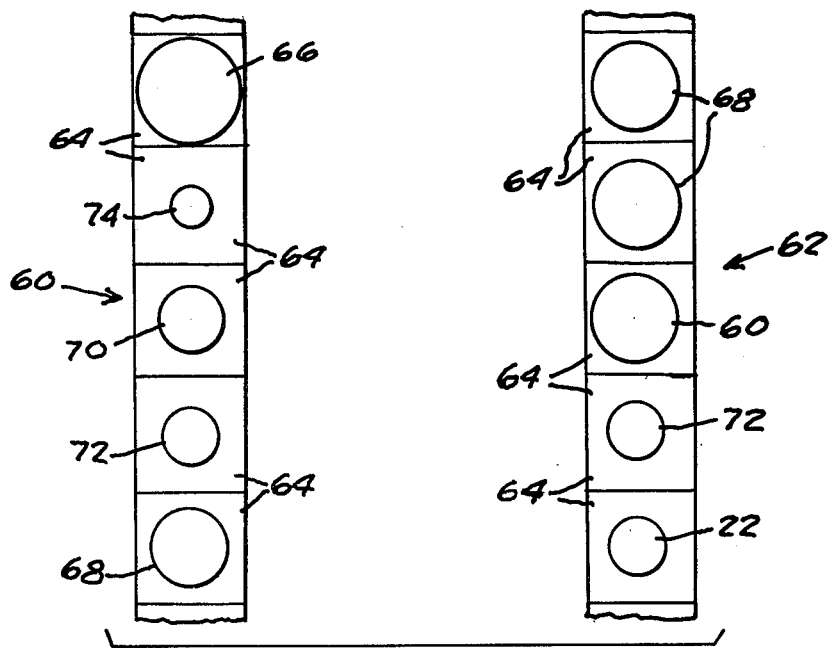
FIG. 2 is a fragmentary diagrammatic plan view of the apparatus.
Figure 3:
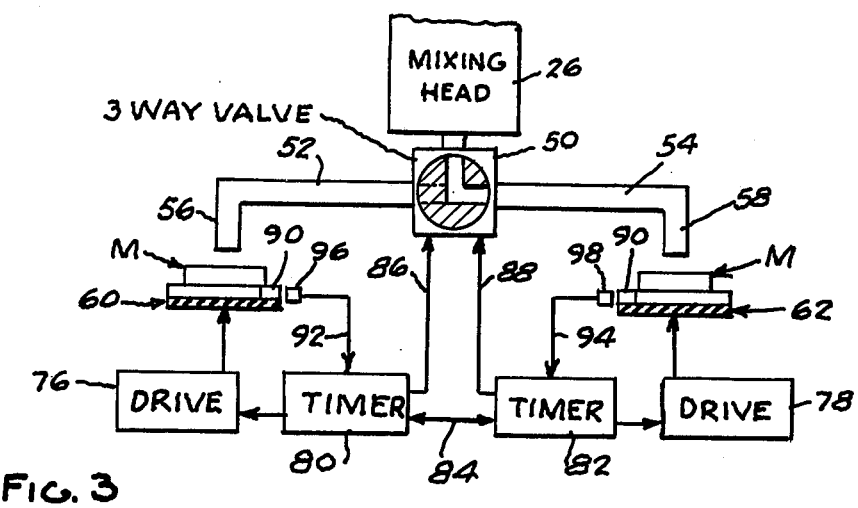
FIG. 3 is a diagrammatic view illustrating the drive and synchronizing mechanism for the apparatus.

Mixing head 26 has an outlet 48 which communicates through a three-way valve 50 with a pair of branches 52,54 which terminate respectively in outlet nozzles 56,58. A conveyor 60 moves intermittently horizontally beneath nozzle 56 and a conveyor 62 moves intermittently horizontally beneath nozzle 58. Each conveyor carries a series of molds M successively into alignment beneath its respective dispensing nozzle. The conveyors step or index forward alternately so that one is stationary with a mold M thereon being filled while the other is carrying a mold thereon into position to be filled. The conveyors are conventional and can comprise, for example, a series of plates 64 carried in an endless path by chains entrained around sprocket wheels (not shown). The molds M on each conveyor can be all of the same size or can be of different sizes as indicated at 66-74 in FIG. 2 wherein molds of the same size are indicated by like reference numerals.

Conveyors 60,62 respectively have independent motor powered drive mechanisms 76,78 controlled in part by timers 80,82 respectively. The timers have interconnected circuitry represented at 84 and circuitry for controlling the movements of valve 50 as represented at 86 and 88. Where molds M are of different sizes, they or conveyors 60,62 may be provided with signaling devices 90 which emit signals indicating the sizes of the molds, and timers 80,82 may be connected by circuitry 92,94 respectively with sensors 96,98 capable of reading the signals and transmitting the size indicia represented thereby to the timers.

Typically, apparatus 20 can be used to mix and dispense compositions which react to form polyurethane. In such a use, one of tanks 22,24 would contain a polyisocyanate and the other an active hydrogen containing organic compound such as a hydroxy-terminated polyester.

In operation, it will be assumed that mixing head 26 is in operation and that three-way valves 32,42 are in the solid line position of FIG. 1 so that fluid is being furnished to the mixing head from each of sources 22,24 by pumps 28 and 38. Three-way valve 50 is in the solid line position of FIG. 1 so that the mixture emerging from the mixing head through outlet 48 is valved into branch 54 and is dispensed through nozzle 58 into a mold M positioned beneath the nozzle on conveyor 62 which is stationary. At this time, conveyor 60 is either moving forward to carry a mold M into alignment beneath nozzle 56 or it has completed this forward movement and has come to rest with the mold so positioned.

The duration of the dispensing through nozzle 58 is controlled by timer 82. When timer 82 times out, it shifts valve 50 from the solid line position of FIG. 1 to the dotted line position thereby cutting off the flow of fluid through nozzle 58 and transferring the flow from outlet 48 into branch 52 so that the mixture begins to dispense through nozzle 56 to the awaiting mold M on stationary conveyor 60. At the same time, timer 82 activates timer 80, which controls the duration of dispensing through nozzle 58, and actuates drive 78 for conveyor 62. Conveyor 62 steps or indexes forward to carry the succeeding mold in its series into alignment beneath dispensing nozzle 58. When the mold arrives beneath the nozzle it signals its arrival by suitable means such as engagement with a limit switch (not shown) connected into the drive and synchronizing circuitry, operation of the limit switch also deactuating drive 78 so that conveyor 62 halts. Sensing device 98 senses the signal from the signalling device 90 associated with the mold just arrived and causes timer 82 to set at the proper dispensing duration for this mold.

When timer 80 times out, it returns valve 50 to the solid line position of FIG. 1 so that dispensing through nozzle 56 is cut off and dispensing through nozzle 58 is resumed. At the same time, timer 80 activates timer 82 and actuates drive 76 which causes conveyor 60 to step or index forward to carry the next mold M in its series into alignment beneath nozzle 56. When the mold is properly aligned beneath the nozzle, means such as a limit switch (not shown) is operated to signal arrival of the mold and to deactuate drive 76 whereupon movement of conveyor 60 halts. Sensing device 96 senses the signal from the signalling device 90 associated with the mold just arrived and causes timer 80 to set at the proper dispensing duration for this mold. Thereafter, the cycle of operation described above repeats.

In any cycle of operation, should a mold M fail to signal its arrival in proper alignment with dispensing nozzle 56 or 58, timer 80 or 82 will still shift valve 50 but at the same time, through suitable circuitry (not shown) the timer will also shift valves 32,42 from the solid line to the dotted line position of FIG. 1 so that the flow of fluids from sources 22,24 to mixing head 26 is cut off and no fluid mixture is dispensed through nozzle 56 or 58 to the improperly positioned or missing mold M. Instead, the fluids are recirculated through lines 36,46 back to sources 22,24. This condition prevails during subsequent cycling of the machine until a mold M signals its arrival in proper alignment with a nozzle 56 or 58 which conditions timer 80 or 82 to return valves 32,42 to the solid line position of FIG. 1 simultaneously with shifting valve 50 so that mixing and dispensing is resumed.

In the apparatus shown in FIGS. 1-3 and 5, operation of conveyor drives 76,78 and the dispensing intervals through nozzles 56,58 are preferably so synchronized that the time required to advance each conveyor a single step is equal to or less than the dispensing interval to insure that in normal operation a mold will have been carried into alignment with a nozzle 56 or 58 by the time the preceeding dispensing interval ends and valve 50 is shifted. Preferably, movement of conveyors 60,62 is halted after they have traveled through a predetermined distance rather than for a predetermined time interval to minimize malfunctions arising from the various timing mechanisms getting out of phase. In the apparatus shown in FIGS. 1-3 and 5, the various timers, drives, circuitry, signalling devices 90, sensors 96 and items of hardware in general are conventional.

From the above described mode of operation of machine 20, it will be seen that fluid from sources 22,24 is continually furnished to mixing head 26 which operates continuously and the fluid mixture continuously flows through outlet 48 to valve 50 for dispensing either through nozzle 56 or nozzle 58. There is no cyclic starting and stopping of the flow of fluids to or through the mixing head. Thus, the inaccuracies of the ratio of the fluids arising in the conventional machine from the intermittent flow from the sources to the mixing head are eliminated. Therefore, commercially acceptable products much smaller than previously possible can be made on machine 20.

For example, in a typical machine 20, commercially acceptable polyurethane products having about 6 grams weight are now being manufactured in production quantities. Conveyors 60,62 index in 1.2 seconds and the dispensing interval through nozzles 56,58 is 1.33 seconds. Thus, the machine produces 6 gram products at the rate of about 45 per minute. Moreover, in experimental use of an apparatus 20, polyurethane products having about 2.25 grams weight are now being made having a weight variation of ±0.05 gram and in which the accuracy of the ratio of the mixed components is consistently within the required 1%. Each dispensing interval is 0.4 seconds. There appears to be no reason why commercially acceptable polyurethane products having about 2.2 grams weight can not be made in production quantities on a machine 20.

Based on experimentation, it appears that in making products smaller than about 2 grams weight, the predominant problem will lie not in obtaining uniformity of material but in attaining accuracy of operation of the valving which controls the flow of fluent materials to the dispensing nozzles. In forming small articles, the inertia of the valving becomes significant. It is contemplated that in the manufacture of some products for which the dispensing interval is short, i.e., 0.7 seconds or less, it will be unnecessary to index conveyors 60,62. The conveyors will be moved continuously and the dispensing will occur while each mold moves diametrally beneath a nozzle 56 or 58.

In the conventional machine, it is necessary to flush out mixing head 26 periodically to remove accumulations of fluids which have reacted therein during the intervals in which there is no flow of fluid through the head. I have discovered that in a machine 20 it is seldom if ever necessary to halt a production run for the purpose of flushing out the mixing head apparently because the continuous flow of fluids therethrough constitutes a continuous self-flushing. Contrary to the normal expectation that problems will arise upon increasing the rate of operation of a process or machine, I have found that the higher the rate of flow of fluids through mixing head 26, the better machine 20 works.

Figure 4:
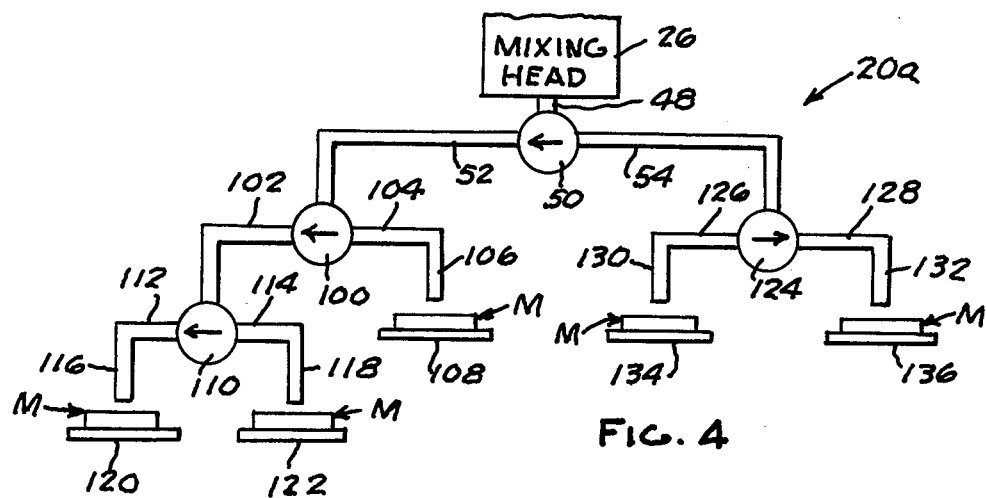
FIG. 4 is a diagrammatic view illustrating a modified form of the invention.
Figure 5:
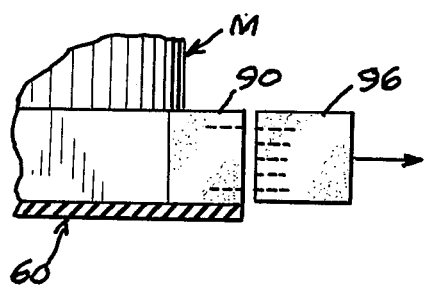
FIG. 5 is a diagrammatic view illustrating a signal and sensing device utilized in conjunction with the drive and synchronizing mechanism.

The apparatus 20a shown in FIG. 4 is generally similar to apparatus 20 except that outlet branch 52 from mixing head 26 communicates through a valve 100 into further branches 102 and 104, the latter terminating at a dispensing nozzle 106 disposed above a conveyor 108 which carries a succession of molds M into alignment therewith. Branch 102 communicates through a valve 110 into yet further branches 112 and 114 which terminate respectively at dispensing nozzles 116 and 118 positioned above conveyors 120 and 122, each of which carries a succession of molds M beneath the respective nozzles. Branch 54 communicates through a valve 124 with further branches 126 and 128 terminating respectively at dispensing nozzles 130 and 132 disposed above conveyors 134 and 136 which carry a succession of molds M beneath the latter nozzles.

Valves 100, 110 and 124 are three-way valves similar to valve 50 and the structure of conveyors 108, 120, 122, 134 and 136 may be similar to that of conveyors 60,62. The circuitry and controls for the valves and conveyors of machine 20a may be of the same general type as those shown in FIG. 3 with suitable conventional modifications for synchronizing the indexing of the conveyors and shifting of the valves.

The apparatus 20b shown in FIG. 6 is similar in structure and functioning to that of apparatus 20 except that conveyors 138,140 reciprocate in opposite directions beneath dispensing nozzles 56,58. The conveyors respectively carry molds 142 and 144 which are elongate in the direction of movement of the conveyors. Mold 142 has opposite end portions 146 and 148 and mold 144 has opposite end portions 150 and 152. Each conveyor 138,140 runs to the left as FIG. 6 is viewed while the respective mold is being filled and has a rightward return run while the other mold is being filled. For simplicity of operation the conveyors may be reciprocated continuously. Thus, in FIG. 6 conveyor 138 has just completed its mold filling run during which time fluid mixture is dispensed into the mold through nozzle 56 while conveyor 140 has just completed its return run.

At this point, mold ends 146,150 are overlapped in a direction lateral to the direction of movement of the conveyors so that nozzle 56 is positioned above end portion 146 of mold 142 and nozzle 58 is postioned above end portion 150 of mold 144. At this time, an end face 154 of mold 142 trips a limit switch 156 which shifts valve 50 to cut off the flow of fluid mixture from nozzle 56 and transfer the flow to nozzle 58. At the same time, suitable conventional controls are actuated to reverse the direction of movement of conveyors 138,140. Conveyor 140 carries mold 144 to the left while fluid is being dispensed into the through nozzle 58. At the same time, conveyor 138 moves to the right in its return run.

When molds 142,144 attain the dotted line position of FIG. 6, end portions 148,152 of the molds are overlapped in a direction lateral to the direction of movement of the conveyors so that end portions 148, 152 respectively are aligned beneath nozzles 56,58. At this time, an end face 158 on mold 144 trips a limit switch 160 which again reverses the direction of movement of the conveyors and again shifts valve 50 to cut off the flow of mixture to nozzle 58 and direct the flow to nozzle 56. Molds 142,144 respectively are carried in their filling run and return run until the conveyors and molds return to the solid line position of FIG. 6 whereupon the cycle is complete and repeats. As in apparatus 20, limit switches 156,160 and related circuitry signal arrival of a mold 142,144 respectively in proper alignment with a nozzle 56 or 58 and in the absence of such a signal the circuitry is conditioned to operate valves 32,42 (FIG. 1) in the manner described.

The structure and functioning of the apparatus 20c shown in FIG. 7 is generally similar to that of apparatus 20 except that a single conveyor 162 is provided which may be similar to conveyor 60 or 62. This conveyor moves continuously and carries a series of molds 164 and a series of molds 166. The two series of molds are spaced apart laterally of the direction of movement of the conveyor so that molds 164 pass beneath nozzle 56 and molds 166 pass beneath nozzle 58. The molds of the two series are disposed in staggered relation. Each mold 164 has a forward portion 168 and a rearward portion 170 and each mold 166 has a forward portion 172 and a rearward portion 174. Forward portions 168 of molds 164 are overlapped with rearward portions 174 of molds 168 in a direction lateral of the direction of movement of conveyor 162. Similarly, forward portions 172 of molds 166 are overlapped with rearward portions 170 of molds 164 in the same direction. With this arrangement, forward portion of a mold 164 and a rearward portion of a mold 166 pass simultaneously beneath nozzles 56,58 and vice versa.

In the position of the parts shown in FIG. 7, filling of a mold 166 has just been completed and rearward portion 174 thereof is still aligned beneath nozzle 58. Forward end 168 of a mold 164 has become aligned with nozzle 56. At this time, a forward face 176 of mold 164 has tripped a limit switch 178 to shift valve 50 to cut off the flow of fluid from nozzle 58 and divert the flow of the fluid through nozzle 56. This flow continues while mold 164 is moved to the right as FIG. 7 is viewed by conveyor 162.

The rearward end 170 of the mold being filled and the forward end portion 172 of the succeeding mold 166 arrive at the same time and the alignment respectively beneath nozzles 56 and 58. At this time, a forward face 180 on mold 166 trips a limit switch 182 causing valve 50 to shift and cut off the flow of fluid through nozzle 56 and again direct the flow of fluid through nozzle 58. Upon continued movement of conveyor 162, the left mold 166 shown in FIG. 7 is carried beneath nozzle 58 until its rearward end portion 174 is aligned beneath the nozzle whereupon mold 166 is filled. At this time, forward face 176 of the succeeding mold 164 again trips limit switch 178 for shifting valve 50 and the cycle repeats.

As in apparatus 20, limit switches 178,182 and related circuitry signal arrival of a mold 164 or 166 respectively in proper alignment with a nozzle 56 or 58 and in the absence of such a signal the circuitry is conditioned to operate valves 32,42 (FIG. 1) in the manner described.

The structure and functioning of apparatus 20d shown in FIGS. 8-10 is generally similar to that of apparatus 20 except that conveyors 184 and 186 are of the walking beam type and each mold M has a circular mold cavity 188. When the molds are brought into alignment beneath nozzles 56,58 they are deposited on a turntable 190 and during the dispensing step the turntable is turned so that cavity 188 is filled.

In the apparatus illustrated, each conveyor has a pair of side rails 192, a pair of stationary rails 194 which support molds M while they are at rest between indexing movements and a pair of rails 196 forming walking beams which transport the molds during the indexing movement. Side rails 192 contain molds M laterally while they are supported on stationary rails 194. Each walking beam 196 is actuated by a motor driven wheel 198 having a connecting rod 200 secured thereto at an eccentric location 202, an end 204 of the rod being connected to a bell crank 206 pivoted at 208 on a member 210 longitudinally movably supported on rollers 212. The opposite end of crank 206 is pivotally secured at 214 to walking beam 196. Member 210 and walking beam 196 are interconnected by pivoted parallel links 216.

When rod 200 is in its retracted position illustrated in solid lines in FIG. 10, crank 206 is in a relatively clockwise attitude and walking beam 196 is in the downward solid line position of FIG. 10. When wheel 198 is rotated (in either direction), rod 200 is advanced to the right as FIG. 10 is viewed and during an initial increment of this movement crank 206 is rocked counterclockwise which elevates walking beam 196 to the dotted line position of FIG. 10 thereby lifting molds M off of supported relation on support rails 194 or turntable 190. Counterclockwise movement of the crank continues until it is halted by a stop 218. Thereafter, upon continued rotation of wheel 198, rod 200 moves element 210 and walking beam 196 on rollers 212 to the far-right dotted line position of FIG. 10, thereby advancing the series of molds M thereon through one stepping or indexing interval.

Upon continued rotation of wheel 198, crank 206 returns clockwise to the relative attitude shown in solid lines in FIG. 10 thereby lowering walking beam 196 so that the molds M thereon are again disposed on support rails 194 or turntable 190. Then, when wheel 198 completes one rotation, rod 200 returns element 210 and walking beam 196 to the right on rollers 212 and the conveyor is ready for a subsequent similar cycle of operation. The structure and functioning of conveyors 184,186 is conventional.

Conveyors 184,186 are actuated alternatively so that the molds M thereon are alternatively positioned respectively beneath nozzles 56 and 58. Turntable 190 has an upper frictional force 220 of rubber or the like which is elevated above the upper surfaces of rails 194, 196 (FIG. 9) so that when a mold M is disposed thereon it is free to rotate with turntable 190. The turntable is driven by a motor 222 through a transmission 224 which also has an output shaft 226 connected to an electrical pulse generator 228 connected by circuitry 230 to a pulse counter 232. The pulse counter is connected by suitable conventional circuitry (not shown) with the drive motors for conveyors 184,186 and with the shifting device for valve 50.

In operation, motor 222 continuously rotates turntable 190 at about 60 r.p.m. Assuming that dispensing of the fluid mixture through one nozzle 56, 58 into the subjacent mold cavity 188 has just begun, as turntable 190 rotates electrical pulses are generated by generator 228 and are counted by counter 232. When the counter has counted a number of pulses which represents the arcuate extent of cavity 188, in this case 360°, the counter shifts valve 50 to cut off the flow of fluid from the one nozzle 56 or 58 and to direct the flow through the other nozzle to begin filling the cavity 188 of an awaiting mold M. At the same time, counter 232 actuates the drive for its respective conveyor 184 or 186 to advance the succeeding mold M for deposit on turntable 190.

As in apparatus 20 (FIGS. 1–3 and 5) a suitable device such as a limit switch and related circuitry signals arrival of a mold in proper alignment with a nozzle 56 or 58 and in the absence of such a signal the circuitry is conditioned to operate valves 32,42 (FIG. 1) in the manner described. The use of pulse generator 228 and counter 232 to measure the angular extent of rotation of turntable 190 and therefore of mold cavity 188 insures that on the one hand there will be no unfilled gap in mold cavity 188 and on the other hand that there will be no overlapping or duplication of filling in the mold cavity.

I claim:

1. Apparatus for mixing reactive fluids and dispensing the resulting mixture into molds which comprises,
   a source of each of a plurality of fluids,
   a mixing head and means operable to furnish fluid thereto substantially continually from each of said sources for mixing,
   said mixing head having an outlet, valving and a plurality of dispensing nozzles downstream of said outlet,
   said valving being operable to direct a continuous flow of said mixture from said outlet to said nozzles in a predetermined sequence,
   at least one mold for each of said nozzles,
   motor means operable to effect relative movement between said nozzles and their respective molds to, during, and from aligned relation,
   and means operable to synchronize operation of said valving with said relative movement so that substantially continually during operation of said apparatus said mixture is dispensed through at least one of said nozzles into a mold moving in alignment therewith.

2. The apparatus defined in claim 1 wherein said motor means includes conveyor means on which said molds are mounted for movement adjacent said nozzles to effect said relative movement.

3. The apparatus defined in claim 2 wherein said conveyor means includes at least two conveyors which reciprocate in relatively opposite directions.

4. The apparatus defined in claim 3 wherein each of said two conveyors moves alternately in a mold filling run and a return run, said synchronizing means being operable to reverse the direction of movement of said two conveyors after completion of each run thereof.

5. The apparatus defined in claim 4 wherein each conveyor carries a single mold which is elongate in the direction of movement of its conveyor, each said conveyor being operable to move its said mold past a said nozzle while said mixture is dispensed therethrough.

6. The apparatus defined in claim 5 wherein said molds have end portions which overlap in a direction lateral to said paths at the ends of said runs, said nozzles being positioned respectively above said overlapped portions when said conveyors are at the end of a said run.

7. The apparatus defined in claim 6 wherein said synchronizing means is operable so to reverse said direction of movement substantially simultaneously.

8. The apparatus defined in claim 7 wherein said synchronizing means responds to movements of said molds through distances equal to a said run to so reverse said direction.

9. The apparatus defined in claim 8 wherein said molds have substantially the same length.

10. The apparatus defined in claim 2 wherein said conveyor means comprises a single conveyor, said molds including two series of molds spaced apart laterally of the direction of movement of said conveyor, the molds in each series being spaced apart in said direction, the molds of said two series being positioned in relatively staggered relation.

11. The apparatus defined in claim 10 wherein each mold in one series has a forward portion and a rearward portion which respectively overlaps a rearward portion and a forward portion of a mold in the other series, said nozzles being positioned respectively above said overlapped portions when the latter are longitudinally aligned therewith.

12. The apparatus defined in claim 11 wherein said synchronizing means includes means operable to shift said valving responsive to arrival of said overlapped portions into longitudinal alignment with said nozzles.

13. The apparatus defined in claim 1 wherein said motor means is operable to effect said relative movement of each nozzle and its respective mold to and from vertical alignment,
at least one of said molds having a curvilinear mold cavity,
said motor means being operable to effect relative movement of said one mold and nozzle in a corresponding curvilinear path while said one mold and nozzle are in said vertical alignment and during said dispensing,
said synchronizing means being operable to shift said valving and thereby terminate said dispensing responsive to said relative curvilinear movement through a predetermined curvilinear extent of said cavity.

14. The apparatus defined in claim 13 wherein said motor means includes a table which supports said one mold when the latter is so aligned beneath its nozzle, said table being operable to move said mold in said curvilinear path.

15. The apparatus defined in claim 14 wherein said cavity is arcuate, said table comprising a turntable operable to rotate said mold.

16. The apparatus defined in claim 13 wherein said motor means is operable to move said one mold to and from said alignment in a substantially rectilinear path.

17. The apparatus defined in claim 13 wherein said relative curvilinear movement is rotary and said synchronizing means so responds to said relative rotation through a predetermined angle.

18. The apparatus defined in claim 17 wherein said angle is substantially 360°.

19. The apparatus defined in claim 1 wherein for each of said nozzles there is a series of said molds successively moved by said motor means into alignment beneath a said nozzle,
the molds of the respective series being so aligned in said sequence,
said synchronizing means being effective upon expiration of a predetermined interval of said dispensing into one mold to shift said valving for dispensing into another mold.

20. The apparatus defined in claim 19 wherein at least certain of said molds have unlike sizes, indicia of said sizes being associated with said certain molds, said synchronizing means including means effective to sense said indicia and to respond thereto to establish said interval.

21. The apparatus defined in claim 20 wherein said interval is a time interval and said effective means includes timer means operative to establish said interval.

22. The apparatus defined in claim 1 and including in addition, sensing means operable to detect and signal the absence of a mold properly aligned with a nozzle through which said mixture is to be dispensed, and hydraulic circuitry including valve means operable responsive to said signal to prevent the flow of said mixture to the latter said nozzle.

23. The apparatus defined in claim 22 wherein said circuitry is operable to cut off the flow of each fluid from its said source to said mixing head and to return said flow to its said source.

24. The apparatus defined in claim 23 wherein each said source and circuitry comprises a reservoir for a said fluid, a hydraulic line from said reservoir having a pump, said line downstream of said pump branching into a said line to said mixing head and a return line to said reservoir, said valve means being operable responsive to said sensing means to valve fluid received from said pump selectively into said branches.

25. The apparatus defined in claim 1 wherein said outlet has a plurality of branches, said valving including valve means operable to direct said mixture into said branches in a predetermined sequence, at least one of said branches having further branches which terminate at such nozzles, said valving including further valve means operable to direct said mixture received from a first mentioned branch into said further branches in a predetermined sequence.

26. The apparatus defined in claim 1 wherein said motor means includes for each nozzle a conveyor which supports a series of molds for successive movement into alignment beneath said nozzle,
successive molds in each series being so aligned responsive to movement of the respective conveyor through a predetermined distance,
said synchronizing means including means operable to detect and signal movement of a said mold through said distance into said alignment,
said synchronizing means also including means operable under the influence of said signal to shift said valving to initiate said dispensing into said aligned mold.

27. The apparatus defined in claim 26 wherein said synchronizing means is effective upon expiration of a predetermined time interval of the latter said dispensing to shift said valving for dispensing into a mold on another of said conveyors.

* * * * *